Figures 1, 2, 3, 4, 5:
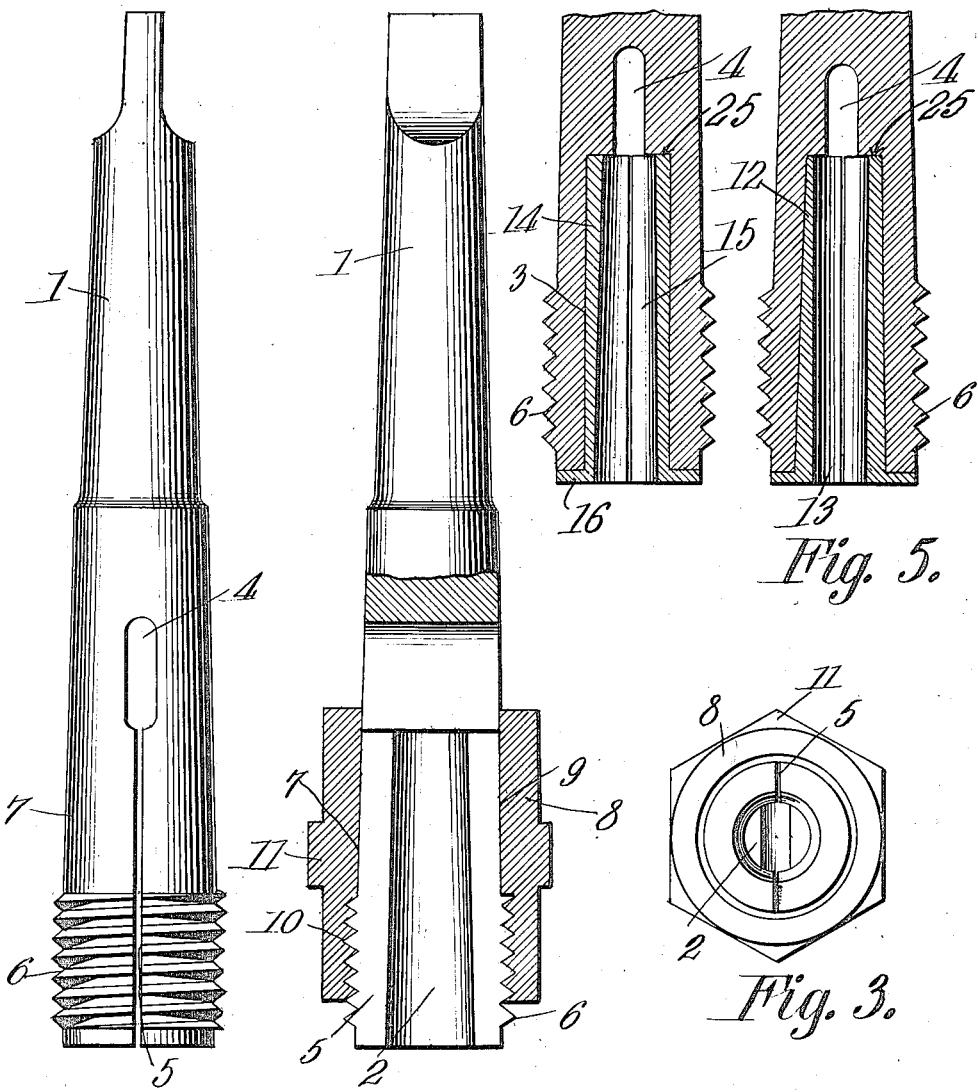

R. M. REAY.
DRILL CHUCK.
APPLICATION FILED MAR. 7, 1907.

1,045,886.

Patented Dec. 3, 1912.

WITNESSES:

Robert M. Reay,
INVENTOR.
By C. A. Snow & Co.
ATTORNEYS

UNITED STATES PATENT OFFICE.

ROBERT M. REAY, OF MASSILLON, OHIO.

DRILL-CHUCK.

1,045,886.   Specification of Letters Patent.   Patented Dec. 3, 1912.

Application filed March 7, 1907. Serial No. 361,121.

*To all whom it may concern:*

Be it known that I, ROBERT M. REAY, a citizen of the United States, residing at Massillon, in the county of Stark and State of Ohio, have invented a new and useful Drill-Chuck, of which the following is a specification.

The present invention relates to improvements in chucks and more especially to that type adapted to receive drills, reamers, and similar tools, and it has for its object to provide a chuck of this character that may be constructed very cheaply and which in use will serve to firmly center and secure the drill or other tool in order that the latter may be used for unusually heavy work.

It also has for its object to provide means for accommodating a chuck having a tapered socket to drills and tools having straight shanks, and vice versa.

To these and other ends, the invention consists in certain improvements and combinations and arrangements of parts, all as will be hereinafter more fully described, the novel features being pointed out particularly in the claims at the end of the specification.

In the drawings, Figure 1 is a side elevation of the chuck with the clamping sleeve removed. Fig. 2 represents a longitudinal section through the tool receiving portion of the chuck. Fig. 3 is an end elevation of the chuck viewed from the bottom in Fig. 2. Figs. 4 and 5 are sectional views of the chuck showing adapters for receiving tapered and straight shank tools respectively.

Corresponding parts in the several figures are indicated throughout by similar characters of reference.

In the present embodiment of the invention the chuck is composed of a bar of steel or other suitable material having at its rear end a shank 1, preferably formed with a Morse taper in order that it may fit universally the tool socket on drill presses or other tools now in use, and the front end of the bar is provided with an axial bore 2 to receive the drill, reamer, or other tool. The socket thus provided in the shank may be formed either with the Morse taper, as shown in Fig. 5, or with a straight bore, as shown at 3 in Fig. 4. In any case it is preferable to provide the shank immediately in rear of the tool receiving socket with a transverse slot 4 adapted to receive a drift or other instrument that will engage the usual transversely extending tang on the upper end of drills and other tools having taper shanks, these tangs being adapted to coöperate with the bore of the transverse slot 4 to prevent relative turning between the chuck and the tool.

The socket portion of the chuck is rendered compressible by providing it with a suitable number of longitudinally extending slots 5, the walls of the socket being thereby divided into a plurality of segmental clamping jaws that are capable of being operated to engage and disengage the shank of a tool that may be inserted into the chuck socket. The means for operating the jaws embody, in the present instance, a peripheral taper 7 formed on the exterior of the body of the chuck and enlarging from the shank end 1 forward to a set of screw threads 6 which are preferably formed on the surface of a cylinder, that is to say, they have an equal diameter throughout their length. Over the tapered portion of the chuck is revolubly fitted a clamping sleeve 8 having an internal taper 9 corresponding to and adapted to coöperate with the taper 7 on the chuck body, a portion of the sleeve beyond the taper being provided with internal threads 10 adapted to coöperate with the threaded portion 6. In order to facilitate manipulation of the clamping sleeve, it is preferable to provide it with a nut or angular portion 11 adapted for the application of a wrench. Rotation of the sleeve in one direction causes the screw threads to draw the sleeve longitudinally of the chuck and toward the opening of the socket, the coöperating taper surfaces 7 and 9 of the chuck body and sleeve respectively causing the segmental jaws surrounding the socket to move inwardly, and thereby clamp the shank of a tool resting therein, the degree of movement of the several jaws being equal so that the tool will be centered accurately according to the axis of revolution of the chuck. Rotation of the clamping sleeve in the reverse direction serves to loosen or unlock the shank of the tool, so that the latter may be removed from the chuck. By arranging the coöperating taper or wedge surfaces of the clamping sleeve and socket at a point intermediate the threads and the tang receiving slot, the compression will be applied to the socket in such a way that not only will its walls close upon the shank of the tool, but the parallel walls of the slot 4 will close upon the sides of the tang so that both surfaces of the latter contact throughout their extent with the said walls and form a firm and positive driving connection between the chuck and tool, so that the tangs cannot become twisted.

In some cases it may be desirable to employ drills or other tools having straight shanks in a chuck having a taper socket, and this may be accomplished by putting an adapter into the socket of the chuck, the adapter in the present instance embodying a sleeve or bushing 12 slotted longitudinally to render it compressible and having an exterior surface formed with a taper matching that in the socket of the chuck and a straight bore 13 to receive the straight shank of the drill or other tool, the clamping sleeve operating to compress the jaws of the chuck body and also the adapter about the drill or other tool. On the other hand, should it be desirable to operate drills or other tools having taper shanks in connection with a chuck having a straight bore, an adapter 14 may be employed which has a cylindrical outer surface of a diameter to fit the bore of the socket and a taper bore 15 to receive the drill or other tool, the rear of the adapter being open to permit the tang on the drill or other tool shank to project into the slot 4. In either case the adapters are readily removable so that the chucks may be employed with drills or other tools having shanks corresponding to their sockets. It will be noted that each adapter is provided at its large end with an annular flange 16. This flange is designed to rest upon or stand near the outer end of the socket, and may be conveniently engaged by a suitable tool for the purpose of extracting the adapter.

A chuck constructed in accordance with the present invention is particularly adapted for use on work of a severe character in which the ordinary two jaw chuck cannot obtain a requisite hold on the tool shank, and it is particularly efficient when used in connection with drills or tools having taper shanks, as the tang is locked by the walls of the transverse drift slot in the chuck and the sides of the shank are firmly clamped by the walls surrounding the socket. This chuck may be manufactured and sold at a low price for the reason that it is composed of but two parts, a number of operations in the manufacture of which may be accomplished on an automatic screw machine. Moreover, the chuck is capable of firmly holding drills, reamers, and other tools the transversely extending tangs of which have been broken or twisted off, as the gripping action of the compressible walls of the socket is exerted throughout the length of the tool shank so that the latter cannot turn relatively to the chuck.

Chucks of much this general type have hitherto been patented, but the peculiar construction of mine, and particularly the disposition of the cylindrical threads beyond the tapered portion instead of in rear of it, results in a number of advantages which I will endeavor to explain. First, the formation of the drift slot 4 through the tapered portion instead of through the threads cuts away less of the latter and therefore leaves them stronger; second, the use of a wedge or tool inserted in this drift slot for driving out the drill will not insure the threads in my construction because they are remote from it; third, in the tightening up of the sleeve its nut or threaded portions draws upon its tapered portion rather than pushing it as would be the case if the threads were located farther back upon the shank; fourth, as the sleeve is turned forward and the jaws are compressed the threads 6 become looser within the nut portion 10 because the former are near the extremities of the jaws which are of course compressed to the greatest degree; and fifth, while the conical portion if at the front would compress the tips of the jaws only to the extent of its longitudinal advance, the nut portion in advancing the same distance travels in a spiral course along threads which are not interrupted by the drift slot.

It is to be noted that the inner end wall of the socket 2 is disposed at right angles to the axis of the chuck thereby to define a shoulder 25. When the adapter 14 is mounted in the socket 2, the flange 16 engages the outer end of the chuck and at the same time the inner end of the adapter engages the shoulder 25. The strain upon the flange 16 of the adapter is therefore relieved when the device is in use. Because the shoulder 25 is disposed at right angles to the axis of the chuck the adapter 14 will not be wedged in the chuck. The longitudinal slit in the adapter 14 is alined with the drift slot 4. Consequently the drift may be driven inwardly to displace the adapter, the drift engaging the inner end of the adapter upon both sides of the longitudinal slit in the adapter. Owing to the fact that the drift will engage the adapter upon both sides of the longitudinal slit therein there will be no springing of the adapter under the action of the drift, and consequently the adapter will be expelled from the chuck readily, there being no binding between the adapter and the chuck, due to a distortion of the adapter under the expelling action of the drift.

What is claimed is:—

In a device of the class described, a chuck having a tapered outer surface and provided with a socket, the inner end wall of which is disposed at right angles to the axis of the chuck to define a shoulder, there being a transverse drift slot through the chuck, opening across the shoulder, and a longitudinal slit in the chuck, opening into the drift slot; an adapter in the socket, having a flange engaging the outer end of the chuck, the inner end of the adapter engaging the shoulder to relieve the strain upon the flange, the rectangularly disposed position of the shoulder preventing a wedging of the adapter in the chuck; the adapter having a longitudinal slit alined with the drift slot, whereby when the drift is advanced in the drift slot to displace the adapter, the adapter will be engaged by the drift upon both sides of the slit, thus preventing a distortion of the adapter and a consequent binding of the adapter in the socket; and a sleeve movable longitudinally over the tapered outer surface of the chuck to compress the chuck and the adapter about a tool.

In testimony that I claim the foregoing as my own, I have hereto affixed my signature in the presence of two witnesses.

ROBERT M. REAY.

Witnesses:
GEO. R. HANKINS,
ISAAC CONARD.